Patented Jan. 25, 1944

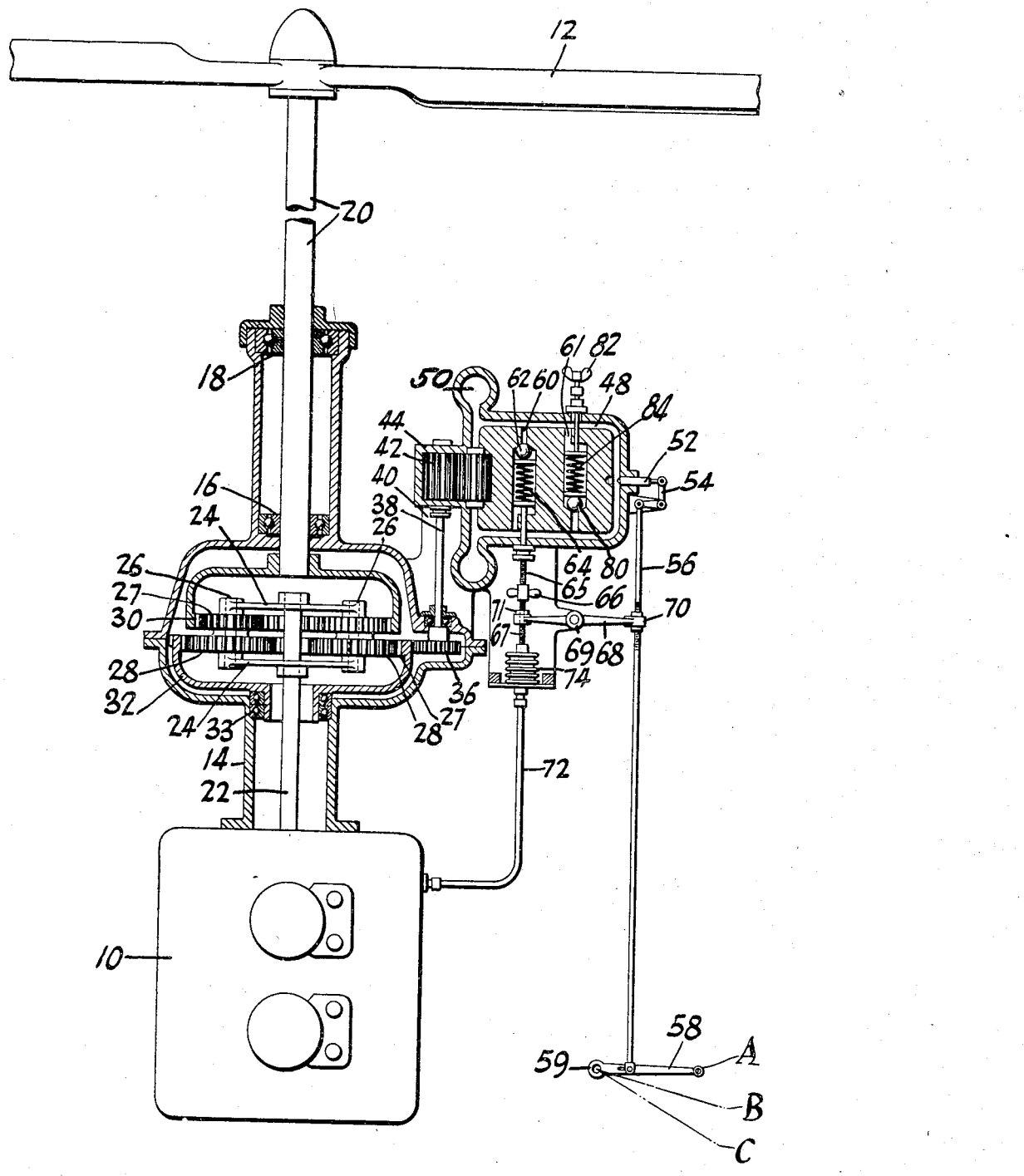

2,340,241

UNITED STATES PATENT OFFICE 2,340,241

AIRCRAFT GEARING

Robert J. Woods, Grand Island, N. Y., assignor to Bell Aircraft Corporation, Buffalo, N. Y.

Application May 20, 1942, Serial No. 443,738

7 Claims. (Cl. 74—293)

This invention relates to aircraft, and more particularly to aircraft operated by supporting rotors and mechanisms for driving the same. The primary object of the present invention is to provide a simplified and otherwise improved rotor drive mechanism for use in connection with helicopter aircraft or the like. Another object of the invention is to provide a power transmission device for the purpose described wherein there is incorporated an improved clutch action. Another object is to provide a power transmission for the purpose described which incorporates means for automatically providing free wheeling of the rotor upon stoppage of the aircraft engine. Another object is to provide a power transmission mechanism for the purpose described wherein means are incorporated to provide an improved form of variable speed reduction during starting of the rotor operation. Another object is to provide a power transmission mechanism for the purpose stated which incorporates means for braking the rotor speed in improved manner. Another object is to provide a power transmission mechanism for the purpose described wherein there is incorporated means for damping the clutch operation and the free wheeling operation of the mechanism in improved manner. Another object is to provide a power transmission mechanism for the purpose described wherein there is incorporated means for disengaging the engine and rotor elements either manually or automatically under overload conditions. Other objects and advantages will appear in the specification hereinafter.

In the drawing, the figure is an elevation of an engine and rotor and power transmission mechanism of the invention, with portions of the power transmission and control mechanisms shown in section. The drawing illustrates the invention in conjunction with an aircraft engine which is designated generally at 10 and a helicopter aircraft rotor designated at 12. A tubular housing 14 extends from the engine 10, and the housing carries through means of spaced bearings 16—18 the rotor shaft 20 so that the shaft is rotatable about its longitudinal axis. The engine is provided with a drive shaft 22 extending into the housing 14 and carrying in keyed relation thereon a pair of spiders 24—24 which carry therebetween at corresponding opposite ends thereof a pair of stub shafts 26—26. Each stub shaft 26 mounts a planetary gear unit comprising a pair of spur gears 27—28 which are fixedly interconnected to provide an integral planetary gear unit rotatable about the axis of the corresponding stub shaft.

An internal ring gear 30 is keyed to the lower end of the rotor shaft 20 and is arranged to mesh at diametrically opposed positions with the spur gears 27—27. A second internal ring gear 32 is rotatably mounted in the housing 14 by means of bearings at 33, and is arranged so as to mesh at diametrically opposed positions with the planetary gears 28—28. Thus, it will be understood that if the ring gear 32 be held against rotation relative to the housing 14 by some such means as will be hereinafter referred to, rotation of the engine shaft 22 will be translated into planetary rotation of the planetary gear units and that the engagement between the gears 28—28 and the ring gear 32 will cause the planetary gear units to rotate about their axes at speeds which are determined by the engine shaft speed and the gear ratios of the gears 28 to the ring gear 32.

If it is preferred to provide the power transmission mechanism to be of speed reducing characteristics, the spur gears 27—27 are arranged to be of lesser diameters than the spur gears 28—28 as illustrated by the drawing; and it will be understood that in such case the gears 28—28 will be forced to translate the engine power into direct rotation of the ring gear 30 but at a speed of reduced order. Hence, it will be understood that the dimensional ratios of the gears 27—28 may be so regulated as to provide any desired degree of speed increase or reduction for normal direct driving of the rotor. Hence, as in the case of the drawing, the mechanism may be arranged for speed reduction to obtain approximately the maximum efficiency speed of the rotor in response to operation of the engine at approximately its maximum efficiency speed of operation.

It will be understood, however, that if the ring gear 32 is unrestrained, it will be driven to rotate in the bearing 33 in response to planetary rotation of the spider and planetary gear unit relative to the ring gear 30; and that under such conditions of operation no power will be transmitted to the rotor shaft 20, and the engine shaft 22 and the rotor shaft 20 will be in effect disconnected. Under such conditions of operation, however, the rotor 12 will be free to rotate relative to the housing 14; and therefore whenever the ring gear 32 is unrestrained it will be understood that the engine may idle relative to the rotor or that the rotor may "free-wheel" relative to the engine. Further, it will be understood that if the ring gear 32 be permitted to rotate in response to the engine driving force at various speeds which are lesser than the unrestrained speed of rotation thereof, as distinguished from total restriction of rotation of the ring gear 32, the power transmission system will translate the engine power output into rotation of the rotor 12 at speeds which will depend upon the rate at which the ring gear 32 is allowed to "slip."

To control the operation of the ring gear 32, a spur gear 36 is arranged to mesh with an external gear portion thereof and the spur gear 36 is keyed to a shaft 38 which is rotatably carried upon a fixed bracket structure designated generally at 40. The shaft 38 is operably coupled to one of the gear members of a gear pump device 42 enclosed in casing 44. The other gear of the pump is meshed with the first mentioned gear thereof for forcing displacement of a fluid substance such as oil or the like through the gear pump device and through a circulating oil conduit system 48 which is arranged in open communication with the oil inlet and oil outlet ports of the gear pump casing. Preferably, a surge chamber 50 is provided in open communication with the fluid circulating conduit system to damp fluid pressure shocks thereon; and it will be understood that upon filling of the oil conveying system and rotation of the gear 36 the pump device 42 will operate to cause fluid to circulate through the conduit 48.

A control valve 52 is mounted upon the bracket 40 so as to be adjustable between conduit-open and conduit-closing positions; that is, the valve member 52 is adapted to be moved from the position illustrated in Fig. 1 to intercept the fluid circulating through the conduit 48 and to either partially or totally block the circulating movement thereof. Thus, it will be understood that if the valve 52 is adjusted to only partially block the circulation of fluid through the conduit 48, the operation of the gear pump device will be in turn correspondingly retarded and the gear 36 will thereby impose a retarding action upon the ring gear 32 whereby the latter is forced to resist engine driving action thereof to a degree determined by the degree of restriction to oil flow which is presented by the valve 52. Or, if the valve 52 is adjusted to totally block circulation of oil through the conduit 48 the gear pump device will be thereby blocked and the spur gear 36 will lock the ring gear 32 against rotation, whereby the power transmission mechanism will in effect be in "clutched" condition and the motor 10 will be directly coupled to the rotor 12 to directly drive the latter at a speed determined by the ratios of the planetary gears 27—28 as explained hereinabove.

To provide the types of operation referred to hereinabove, the valve 52 may be of any suitable variable operation type, such as a needle valve as illustrated in the drawing; and it will be understood that closing of the valve to different degrees will provide either the variable speed or direct drive or free wheeling operations referred to hereinabove. The valve 52 is illustrated diagrammatically herein as being adjustable through means of a bell crank device 54 which is coupled to a push-pull member 56. For manual adjustment of the valve 52 the push-pull member 56 is connected to a hand lever 58 which is arranged to be pivotally mounted at 59 upon any suitable stationary support. Thus, it will be understood that the control lever 58 may be actuated from the valve-open position thereof which is illustrated at A in the drawing through successively reduced open positions toward the completely closed valve position C. Thus, when the control lever 58 is at position A the valve 52 is in wide open or transmission de-clutched position, and when the lever is at position C the valve 52 will be closed and the transmission mechanism will be in direct drive condition. If the control lever is moved to an intermediate position such as indicated at B, the valve 52 will be partly open and the power transmission mechanism will be in reduced speed transmitting condition.

An overload release device is arranged in connection with the oil conduit 48 so as to be adapted to permit the power transmitting mechanism to "slip" under conditions such as when the engine suddenly stops or the rotor becomes jammed, or the like. The release device which is illustrated comprises a pair of conduits 60—61 which bypass the valve 52 and contain oppositely directed check valve devices. For example, the conduit 60 includes an enlarged chamber portion in which is disposed a valve ball 62 adapted to be pressed by means of a compression spring 64 so as to seat against the shoulder at the junction of the reduced and enlarged conduit end portions to provide a check valve arrangement. The spring 64 is backed up by means of a slide rod 65 extending through a suitable packing to a position exteriorly of the conduit casing for screwthreaded connection with one end of a wing nut 66. The opposite end of the wing nut 66 engages an oppositely threaded end portion of a rod 67 which is slidably disposed within an apertured end portion of a rocker arm 68 which is pivotally mounted at 69 upon a stationary support and pivotally connected at its other end by means of a connection device 70 to the push-pull member 56 controlling the valve 52. The rod 67 carries a stop abutment 71 at a position above the rocker 68 in the drawing, whereby it will be understood adjustment of the lever 58 from position A to positions B or C will cause the rocker 68 to lift the rods 67—65 to compress the spring 64.

The compression spring 64 will be so provided as to normally exert sufficient pressure upon the ball 62 to seal the conduit 60, whereby the transmission control operation of the gear pump 44 will be controlled solely by the valve 52. However, if under engine driving conditions the engine suddenly accelerates the sudden increase of torque is translated into increase of fluid pressure forces above the relief valve ball 62, and if the increased pressure is of sufficient degree the ball will be forced away from its seat to permit oil to bypass the control valve 52 so as to provide sufficient slipping action within the transmission mechanism to avoid undue stresses upon the rotor and power transmission systems.

Preferably, the control valve and relief valve operations are arranged to be automatically adjusted in response to changes in the engine operation, and as illustrated by the drawing, such an arrangement is effected by coupling a conduit 72 leading from the engine lubricating oil pressure pump into a Sylphon bellows 74. The moving end portion of the bellows 74 is connected to the control rod 67; and thus it will be understood that upon building up of oil pressure within the engine oil conduit 72, as under high engine power output conditions the control rods 67—65 will be automatically actuated to additionally tension the relief valve spring 64 so as to prevent unintended slippage of the transmission mechanism. However, the relief valve 62 will be at all times adapted to operate as explained hereinabove to relieve the system of any unusually severe loads which may be imposed thereon.

Thus, it will be understood that when the control lever 58 is disposed approximately at the position designated A in the drawing the mechanism will be in idling and clutch-out condition. Upon moving the lever 58 to the position C the control valve 52 will be closed and the relief valve 62 will be stiffened so as to provide direct coupling between the engine and the rotor. For normal cruising operation of the aircraft, the engine throttle will be opened while the lever 58 is simultaneously moved toward position C, whereupon the power transmission mechanism will gradually assume a "clutched" condition while the rotor 12 will have been driven through progressively higher speed ratios relative to the engine. Upon completion of the rotor acceleration the mechanism will be operating as a direct drive device at a ratio corresponding to the ratios of the gears 27—28, and the aircraft will be in normal cruising condition. However, as explained hereinabove, if the rotor jams or the engine suddenly accelerates the relief valve 62 will permit some degree of slippage to take place within the transmission mechanism, whereby excessive shock upon the mechanism will be avoided. A second relief valve as indicated at 80 is arranged in the conduit 61 to release excessive fluid pressure forces within the conduit 48 through bypassing of fluid in opposite direction through the conduit 61 whenever the engine goes dead or is suddenly throttled back under flying conditions, whereby the rotor may "free wheel" to some extent to avoid undue deceleration forces acting upon the rotor.

To effect a gliding maneuver of the aircraft the control handle 58 may be simply shifted from its "clutch-in" position into the position designated A, whereby the engine and rotor will be operationally disconnected. The engine may then be throttled back to idling condition while the rotor 12 will continue to "wind mill" for sustaining the aircraft during the gliding meneuver in the manner of an autogiro. If it subsequently becomes desirable to operationally engage the engine and the rotor, this will be accomplished by simply adjusting the lever 58 toward the positions B—C; and if the engine is simultaneously accelerated the rotor driving operation will be recommenced. Or, upon landing of the aircraft subsequent to an autogiro gliding maneuver as referred to hereinabove, the engine operation may be completely stopped and the rotor movement may be braked by simply moving the lever 58 from position A toward position B. The drag of the inert engine will be thereby employed to brake the rotor operation so as to bring it to a standstill without imposing excessive deceleration stresses thereon.

It will be appreciated that the wing nut 66 may be adjusted by manual rotation thereof to either spread or pull together the control rods 65—67 whereby to correspondingly lengthen or shorten the effective distance between the relief valve spring 64 and the controls therefor, whereby suitable adjustments of the relief valve operation may be readily effected. Also, as illustrated at 82, a screw is preferably provided in conjunction with the spring 84 which backs up the relief valve 80, whereby the spring tension upon the valve 80 may be readily adjusted manually from exteriorly of the mechanism to regulate the valve operation as desired.

Although only one form of the invention has been shown and described in detail, it will be apparent to those skilled in the art that the invention is not so limited but that various changes may be made therein without departing from the spirit of the invention or the scope of the appended claims.

I claim:

1. An aircraft rotor drive mechanism comprising an engine having a power output shaft, a rotor and a drive shaft therefor, a spider carried by said shaft, a planetary gear carried by said spider, a ring gear fixed to said rotor shaft and meshing with said planetary gear, a second planetary gear fixed with respect to said first mentioned planetary gear to move therewith about coincident axes, a second ring gear meshing with said second mentioned planetary gear and mounted so as to be rotatable about the center of rotation of said spider, a spur gear rotatably mounted upon a fixed support and geared to said second mentioned ring gear, braking means coupled to said spur gear and adjustable to provide either totally restricted or unrestricted or partially restricted operation of said spur gear, control means associated with said braking means for adjusting the latter to variously restricting conditions, said control means comprising an engine speed responsive device adapted to automatically adjust said braking means for increased spur gear restriction under increasing engine speed conditions, and a manual over-control device adapted to adjust said braking means irrespective of said responsive device operation.

2. An aircraft rotor drive mechanism comprising an engine having a power output shaft, a rotor and a drive shaft therefor, a spider carried by said shaft, a planetary gear carried by said spider, a ring gear fixed to said rotor shaft and meshing with said planetary gear, a second planetary gear fixed with respect to said first mentioned planetary gear to move therewith about coincident axes, a second ring gear meshing with said second mentioned planetary gear and mounted so as to be rotatable about the center of rotation of said spider, a spur gear rotatably mounted upon a fixed support and geared to said second mentioned ring gear, braking means coupled to said spur gear and adjustable to provide either totally restricted or unrestricted or partially restricted operation of said spur gear, control means associated with said braking means for adjusting the latter to variously restricting conditions, and brake release means automatically responsive to overloads on said braking means for damping the braking operation thereof.

3. An aircraft rotor drive mechanism comprising an engine, a spider carried by the torque shaft of said engine, a rotor and a drive shaft therefor, a planetary gear carried by said spider, a ring gear fixed to said rotor shaft and meshing with said planetary gear, a second planetary gear fixed with respect to said first mentioned planetary gear to move therewith about coincident axes, a second ring gear meshing with said second mentioned planetary gear and mounted so as to be rotatable about the center of rotation of said spider, braking means coupled to said second mentioned ring gear and adjustable to provide totally restricted or unrestricted or partially restricted operation thereof, control means associated with said braking means for adjusting the latter to variously restricting conditions, said control means comprising an engine speed responsive device adapted to adjust said braking means to increasing gear restrictive conditions under increasing engine speed conditions, and a manual over-control device.

4. An aircraft rotor drive mechanism comprising an engine, a spider carried by the torque shaft of said engine, a rotor and a drive shaft therefor, a planetary gear carried by said spider, a ring gear fixed to said rotor shaft and meshing with said planetary gear, a second planetary gear fixed with respect to said first mentioned planetary gear to move therewith about coincident axes, a second ring gear meshing with said second mentioned planetary gear and mounted so as to be rotatable about the center of rotation of said spider, hydraulic braking means coupled to said second mentioned ring gear and adjustable to provide totally restricted or unrestricted or partially restricted operation thereof, control valve means associated with said hydraulic braking means for adjusting the latter to variously restricting conditions, said control means comprising an engine speed responsive device adapted to adjust said valve means to increasing gear restrictive conditions under increasing engine speed conditions, and a manual over-control device.

5. A aircraft rotor drive mechanism comprising an engine, a spider carried by the torque shaft of said engine, a rotor and a drive shaft therefor, a planetary gear carried by said spider, a ring gear fixed to said rotor shaft and meshing with said planetary gear, a second planetary gear fixed with respect to said first mentioned planetary gear to move therewith about coincident axes, a second ring gear meshing with said second mentioned planetary gear and mounted so as to be rotatable about the center of rotation of said spider, hydraulic gear pump means coupled to said second mentioned ring gear, control valve means associated with said gear pump means for adjusting the latter to totally restricted or unrestricted or partially restricted operation conditions, said control valve means comprising an engine speed responsive device adapted to adjust said valve means to increasing gear restrictive conditions under increasing engine speed conditions, and a manual over-control device.

6. An aircraft rotor drive mechanism comprising an engine, a spider carried by the torque shaft of said engine, a rotor and a drive shaft therefor, a planetary gear carried by said spider, a ring gear fixed to said rotor shaft and meshing with said planetary gear, a second planetary gear fixed with respect to said first mentioned planetary gear to move therewith about coincident axes, a second ring gear meshing with said second mentioned planetary gear and mounted so as to be rotatable about the center of rotation of said spider, hydraulic gear pump means coupled to said second mentioned ring gear, said pump means having a bypass conduit and valve means therein adjustable to vary the output capacity of said pump means and comprising an engine speed responsive device for increasing pump restrictive conditions under increasing engine speed conditions, and a second bypass conduit having a check valve means permitting reverse bypass flow to permit free-wheeling of said rotor drive shaft.

7. An aircraft rotor drive mechanism comprising an engine, a spider carried by the torque shaft of said engine, a rotor and a drive shaft therefor, a planetary gear carried by said spider, a ring gear fixed to said rotor shaft and meshing with said planetary gear, a second planetary gear fixed with respect to said first mentioned planetary gear to move therewith about coincident axes, a second ring gear meshing with said second mentioned planetary gear and mounted so as to be rotatable about the center of rotation of said spider, hydraulic gear pump means coupled to said second mentioned ring gear, said pump means having a bypass conduit and valve means therein adjustable to vary the output capacity of said pump means and comprising an engine speed responsive device for increasing pump restrictive conditions under increasing engine speed conditions, a second bypass conduit having a check valve means permitting reverse bypass flow to permit free-wheeling of said rotor drive shaft, and a manual over-control device.

ROBERT J. WOODS.